United States Patent [19]

Miyoshi

[11] Patent Number: 5,053,954
[45] Date of Patent: Oct. 1, 1991

[54] MICROPROGRAM PROCESS FOR SINGLE CYCLE JUMP INSTRUCTION EXECUTION

[75] Inventor: Akio Miyoshi, Ome, Japan

[73] Assignee: Kabushiki Kaisha Toshiba, Kawasaki, Japan

[21] Appl. No.: 620,386

[22] Filed: Nov. 30, 1990

Related U.S. Application Data

[63] Continuation of Ser. No. 175,312, Mar. 30, 1988, Pat. No.

[30] Foreign Application Priority Data

Mar. 31, 1987 [JP] Japan .................. 62-79163

[51] Int. Cl.$^5$ .................. G06F 9/22; G06F 9/32
[52] U.S. Cl. .................. 364/200; 364/262.8; 364/261.5; 364/244.6; 364/271.8
[58] Field of Search ... 364/200 MS File, 900 MS File

[56] References Cited

U.S. PATENT DOCUMENTS

| | | | |
|---|---|---|---|
| 4,742,451 | 5/1988 | Bruckert et al. | 364/200 |
| 4,747,045 | 5/1988 | Harigai et al. | 364/200 |
| 4,760,520 | 7/1988 | Shintani et al. | 364/200 |

Primary Examiner—Lawrence E. Anderson
Attorney, Agent, or Firm—Foley & Lardner

[57] ABSTRACT

A microprogram processor to execute high speed processing of macro instructions using microcodes is provided. This microprogram processor comprises a microcode decoder for decoding a microcode generated from a microprogram ROM in response to a macro instruction, and a jump judgement decoder responsive to a jump condition signal externally delivered and a result decoded by the microcode decoder, to generate a microjump signal when a jump condition holds. The microprogram processor further comprises a circuit for generating a next instruction start signal for immediately shifting to a next instruction on the basis of a decoded signal signifying the start of a next macro instruction when no request for a jump is outputted from the microcode decoder. Such a next instruction start signal generator circuit may be realized by a simple logic circuit. In addition, the jump judgement decoder further responds to data of a portion (e.g., a specific bit) of operation data in addition to the decoded result and the jump condition signal. Such a specific bit may be a MSB. Thus, the execution of the step for shifting data and examining a carry as the jump condition becomes unnecessary.

3 Claims, 5 Drawing Sheets

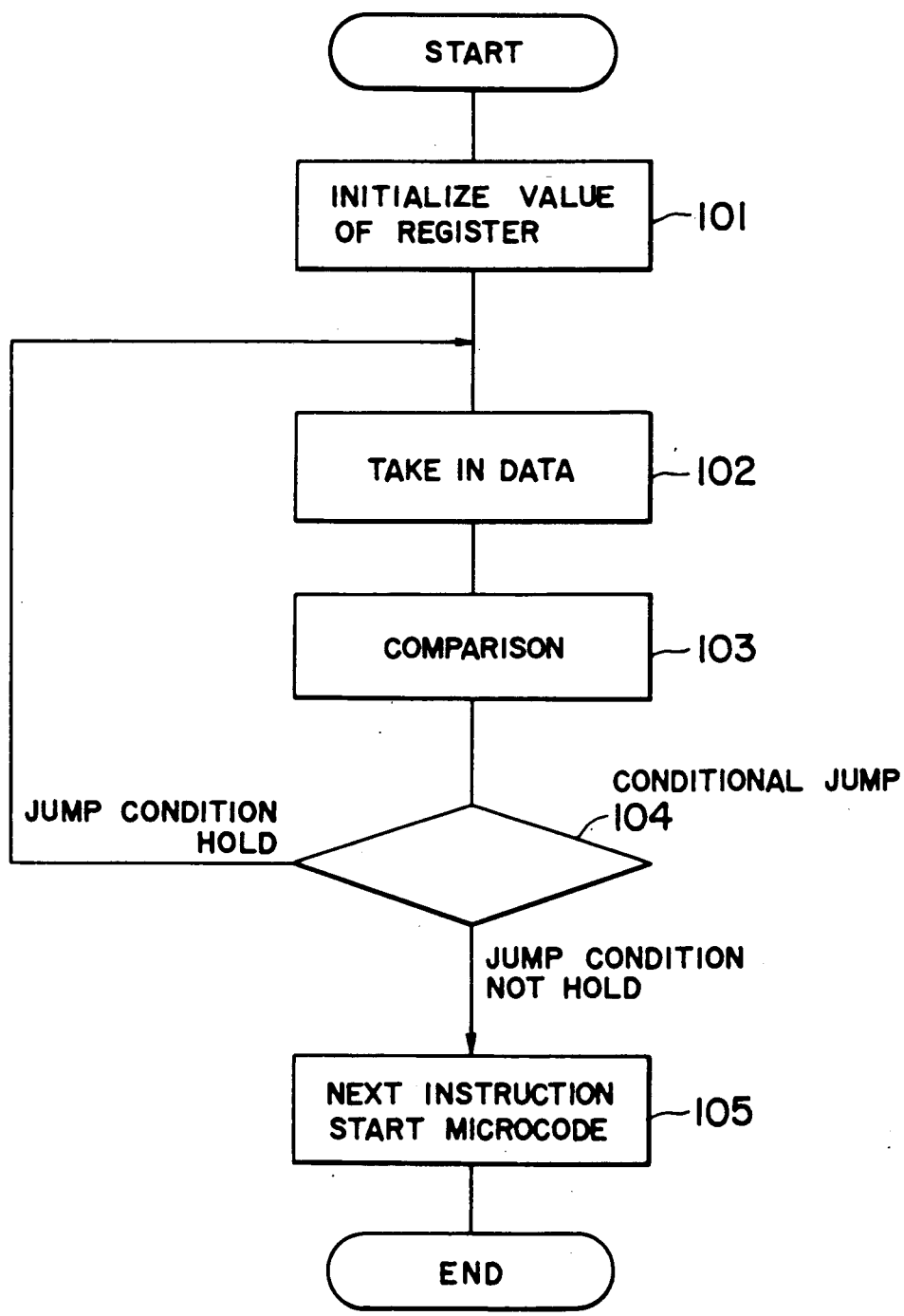
F I G. 7

MICROPROGRAM PROCESS FOR SINGLE CYCLE JUMP INSTRUCTION EXECUTION

This application is a continuation of application Ser. No. 07/175,312, filed Mar 30, 1988, now abandoned.

BACKGROUND OF THE INVENTION

This invention relates to the processor of a microprogram system, and more particularly to a microprocessor capable of executing high speed processing.

In the processor of a microprogram system such as a microprocessor, "conditional jump" micro instructions often appear and execution of high speed processing thereof is required.

In a conventional microprogram processor, even in the case where an immediate transfer or jump to a next macro instruction is inherently possible, there are a lot of cases when it is impossible to transfer to a next macro instruction or generate a microjump signal unless comparison between a microcode decoded in a jump judgement decoder and a specified jump condition signal has been made, which requires execution of extra microprogram steps. Thus, the entire execution time is unnecessarily prolonged and the size of a ROM storing the microprogram has to be increased.

SUMMARY OF THE INVENTION

Therefore, an object of this invention is to provide a microprogram processor capable of carrying out a transfer or jump to a next macro instruction at a higher speed.

Another object of this invention is to provide a microprogram processor capable of transferring to a next micro instruction without examining the presence of a carry as the jump condition.

According to this invention, these and other objects are accomplished by providing a microprogram processor comprising microcode decoding means for decoding a microcode generated from a microprogram ROM (Read Only Memory) in response to a macro instruction, jump judgement decoding means connected to receive a signal decoded by the microcode decoding means along with a jump condition signal so as to generate a microjump signal when a jump condition holds, and means for generating a next macro instruction start signal for immediately shifting to a next macro instruction on the basis of a decoded signal signifying the start of a next macro instruction when no request for a jump is outputted from the microcode decoding means.

With the microprogram processor thus constituted, a decoded signal output when no jump is required and hence the jump condition does not hold is taken out, so as to output a next macro instruction start signal on the basis of this decoded signal as soon as it has been established that no jump is conducted. This permits transfer to the execution of a next macro instruction without waiting the outputting of a next macro instruction start signal in response to a next clock from the microcode decoder, thus reducing the macro instruction execution time.

In addition, according to this invention, the above-mentioned objects can also be accomplished by a microprogram processor comprising microcode decoding means for decoding a microcode generated from a microprogram ROM in response to a macro instruction, and jump judgement decoding means connected to receive a result decoded by the microcode decoding means along with data from a portion of the operation data and a jump condition signal, so as to generate a microjump signal when a jump condition holds.

In this case, a portion of the operation data is used as input data to the jump judgement decoder, thereby eliminating the necessity of executing extra steps for shifting the operation data and examining the carry. Thus, the instruction execution speed can be improved.

Preferred embodiments of this invention will be described with reference to accompanying drawings.

BRIEF DESCRIPTION OF THE DRAWINGS

In the accompanying drawings:

FIG. 7 is a flowchart showing the operation of the microprogram operation in the processor shown in FIG. 5;

DESCRIPTION OF THE PREFERRED EMBODIMENT

For a better understanding of this invention, a conventional microprogram processor will be first described.

Figure 1:
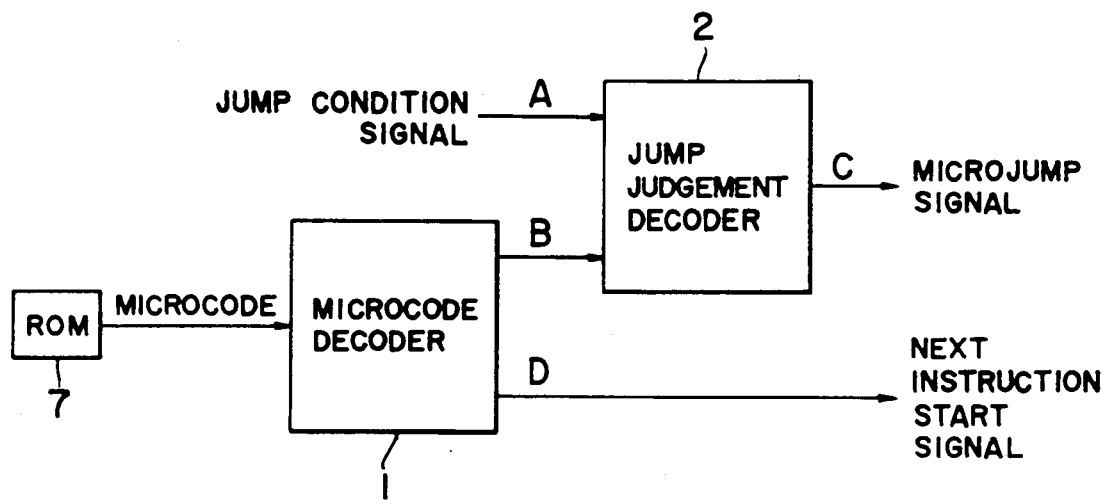
FIG. 1 is a block diagram showing the connection of essential elements of a conventional microprogram processor.

FIG. 1 shows a block diagram for carrying out a jump in a conventional microprocessor. A microcode output, produced by an instruction, from a ROM 7 in which a microprogram is stored is inputted to a microcode decoder 1. A signal B indicative of the necessity to jump is outputted from the microcode decoder 1 and is then applied to a jump judgement decoder 2. To the jump judgement decoder 2, is also inputted a jump condition signal A. On the basis of these signals A and B, a microjump signal C is outputted from the jump judgement decoder 2. If, on the other hand, a microcode for effecting transfer to a next instruction is delivered to the microcode decoder 1 a next instruction start signal D is output therefrom.

Figure 2:
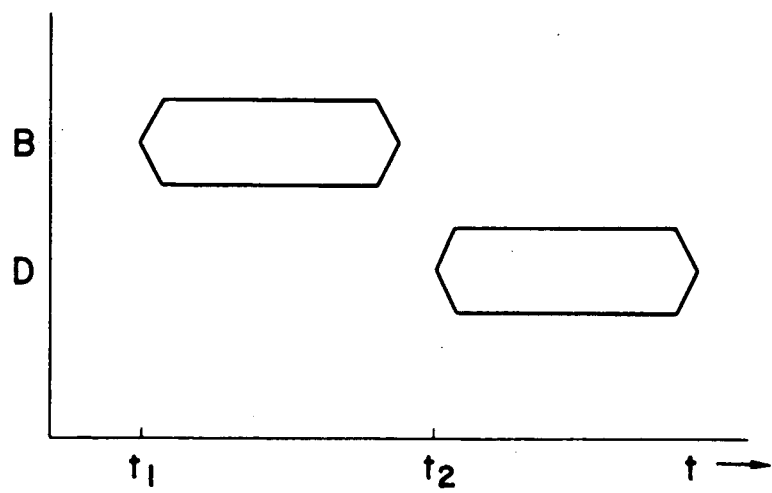
FIG. 2 is a timing chart showing how signals are outputted in the processor shown in FIG. 1.

The relationship between signals B and is shown in FIG. 2. When it is assumed that the signal B is produced at a time $t_1$, the signal D is produced at a time $t_2$ is delayed by one clock from time $t_1$. Accordingly, even if a jump condition in the microprogram does not hold, transfer to the next macro instruction must be delayed until a next macro instruction start signal D is produced, which results in delaying completion of the execution of that macro instruction.

Figure 3:
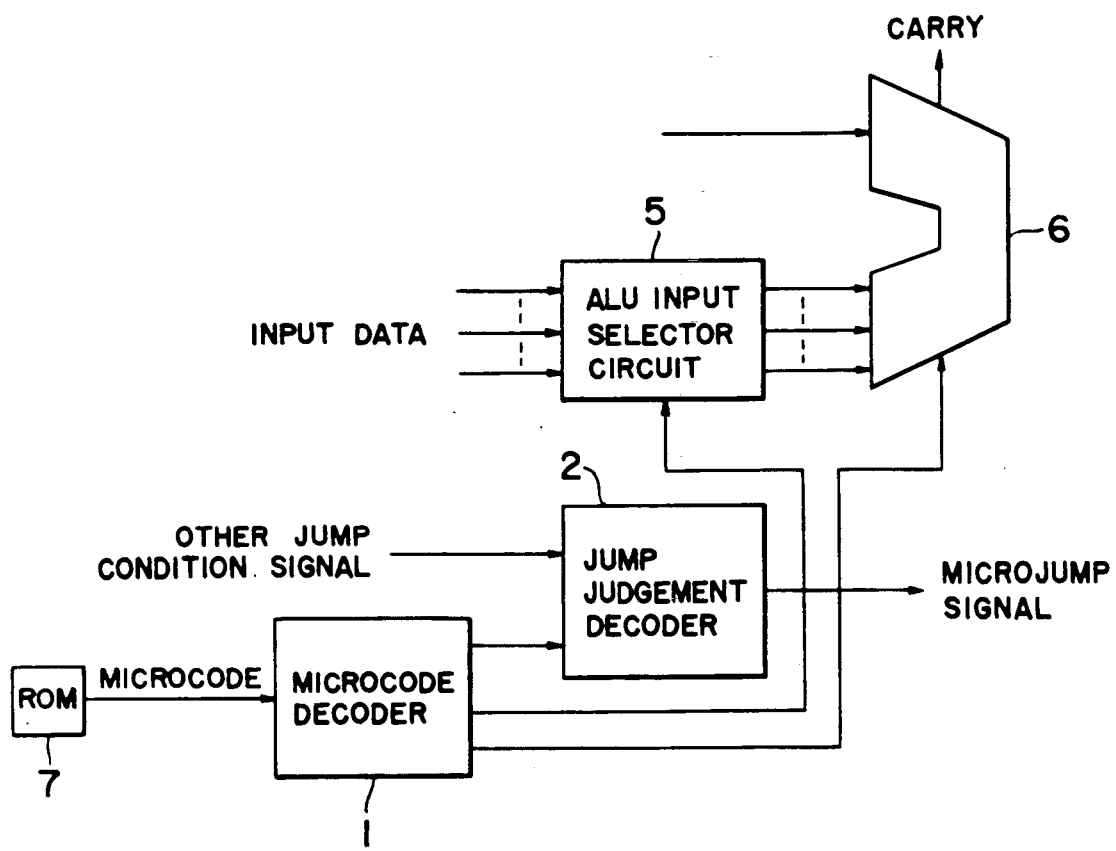
FIG. 3 is a block diagram showing the connection of essential elements of another conventional microprogram processor.

FIG. 3 shows another microprogram processor comprising microcode decoder 1 and jump judgement decoder 2 which are identical to those used in the microprogram processor shown in FIG. 1. Such a processor is used for converting a negative number to a positive number, e.g., when division is performed. This processor is provided, in addition to the circuit shown in FIG. 1, with an ALU 6 for performing operations and an ALU input selector circuit 5 for selecting an input signal to the ALU 6. These components 5 and 6 are respectively controlled by the outputs from the microcode decoder 1.

Figure 4:
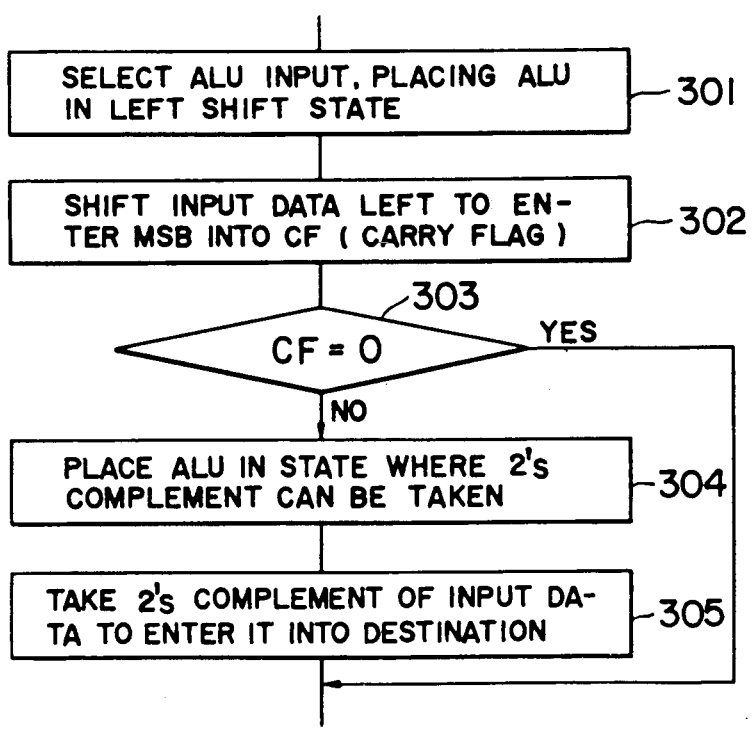
FIG. 4 is a flowchart showing the operation of the processor shown in FIG. 3.

The procedure for converting a negative number to a positive number will be described with reference to the flowchart shown in FIG. 4.

Initially, input data to the ALU 6 is selected by driving the ALU input selector circuit 5, thus placing the ALU in a left shift state (step 301). Then, the input data is shifted left to take out a carry signal which is the MSB (most signification bit) in this condition, so as to enter it into a carry flag CF (not shown) (step 302). Subsequently, the content of the carry flag CF is examined in accordance with the microcode (step 303). As a result, when the carry flag CF is not 0, the input data is judged to be a negative number, so that the ALU 6 is placed in a state where the 2's complement can be taken (step 304). Thus, the 2's complement of the input data is taken out (step 305). In contrast, when the carry flag CF is 0, the input data is judged to be a positive number. Accordingly, there is no need to perform code conversion. The program execution directly jumps to the next step.

Since the jump condition signal in FIG. 3 mainly includes a carry signal, transfer to jump is impossible unless the input data to the ALU 6 is entered into the carry flag CF and is then compared with the microcode.

Figure 5:
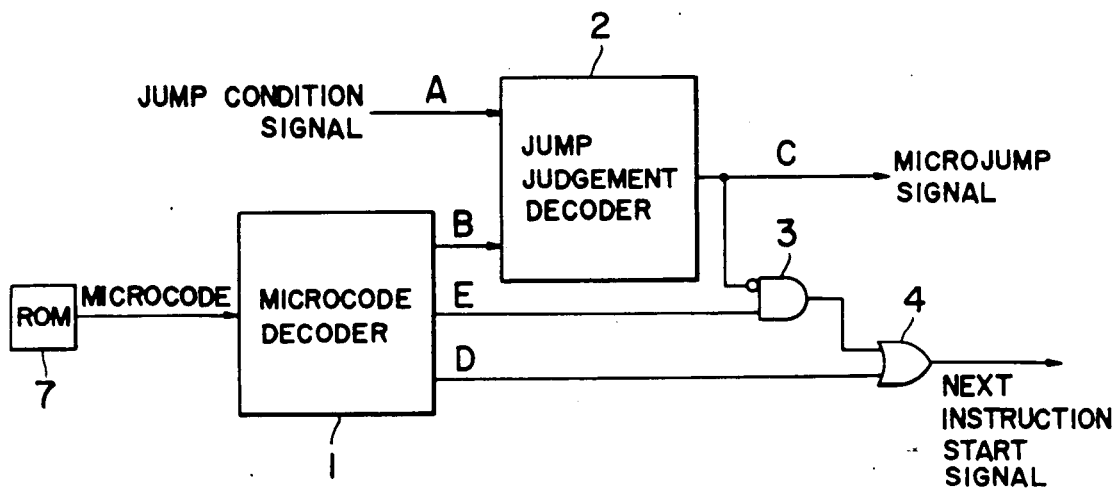
FIG. 5 is a block diagram showing the connection of essential elements of a microprogram processor according to an embodiment of this invention.

Turning now to FIG. 5, as can be seen from this figure, a signal E established by a microcode representing "start a next macro instruction when the jump condition does not hold" is outputted from the microcode decoder 1 in addition to the conventional signals B and D. This signal E is sent to one input terminal of an AND gate 3. An inverted logic signal from the jump judgement decoder 2 is applied to the other input terminal of the AND gate 3. The output from the AND gate 3 is sent to the input terminals of an OR gate 4 along with the next instruction start signal D from the microcode decoder 1.

Figure 6:
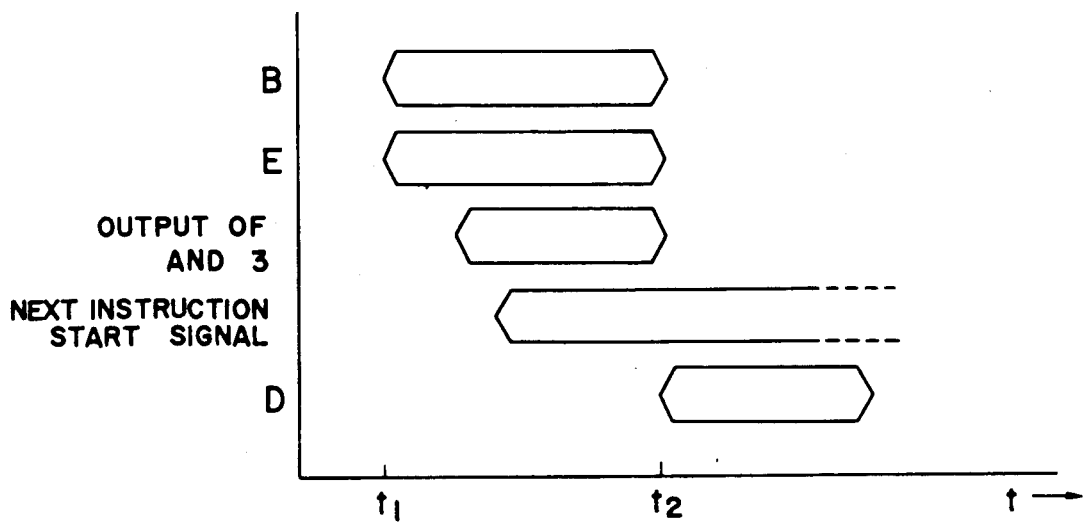
FIG. 6 is a timing chart showing how signals are outputted in the processor shown in FIG. 5.

The operation of the processor shown in FIG. 5 will be described with reference to the timing chart in FIG. 6.

At a time $t_1$, signals B and E are produced at the same time. As has been previously described, the signal B represents the necessity of jump, which is a signal indicating the internal status of the microprocessor, e.g. a flag, etc. In dependence upon the jump condition, a plurality of such signals are provided. In addition, the signals D and E are signals for instructing start of a next instruction.

The signal B is compared with the jump condition signal A in the jump judgement decoder 2. The result of this judgement is outputted as a signal C. When this signal C is not outputted, i.e., when no jump is made, the AND condition in the AND gate 3 holds. As a result, a signal of "1" is outputted from the AND gate 3. Thus, a next instruction start signal is outputted from an OR gate 4. Since the judgement result signal C is generated prior to the signal D, the start of a next macro instruction can be conducted without waiting until time $t_2$ at which a next clock signal is outputted.

FIG. 7 is a flowchart showing the operation of a microprogram in a case where the processor shown in FIG. 5 can be effectively utilized.

Initially, when a start command signal is issued, each value of the necessary registers is initialized to standby execution (step 101). Then, data for comparison is taken in (step 102) and the data thus taken in is compared with a set value (step 103). As a result, when the jump condition does not hold, a microcode of a next instruction start is outputted (step 105). In contrast, when the jump condition holds, the program execution is returned to the step 102. Thus, the steps 102 to 104 are repeatedly executed.

Figure 8:
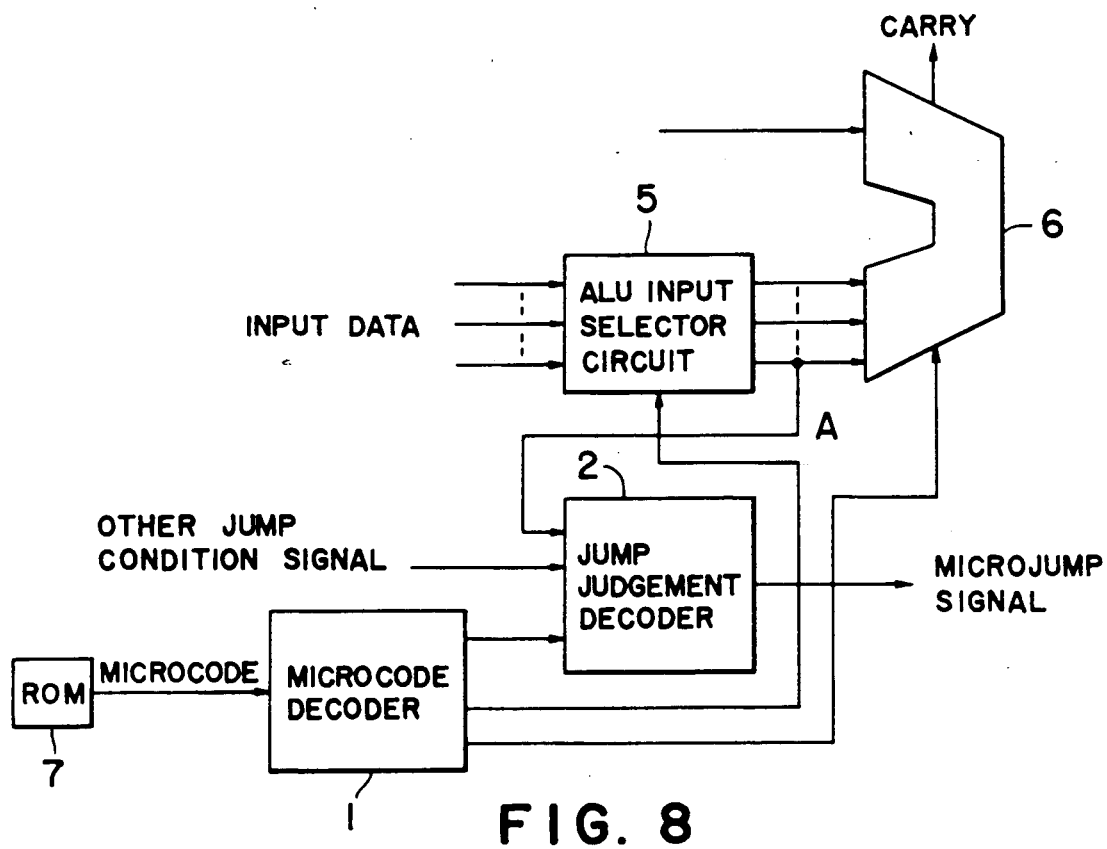
FIG. 8 is a block diagram showing the connection of essential elements of a microprogram processor according to another embodiment of this invention.

FIG. 8 is a block diagram showing another embodiment of a microprogram processor according to this invention.

This embodiment corresponds to the conventional example shown in FIG. 3. This embodiment has the same circuit construction as that of FIG. 3, but differs therefrom in that a signal A taken out from the ALU input selector circuit 5 is applied to the judgement decoder 2. This signal A is, an MSB (sign bit).

Figure 9:
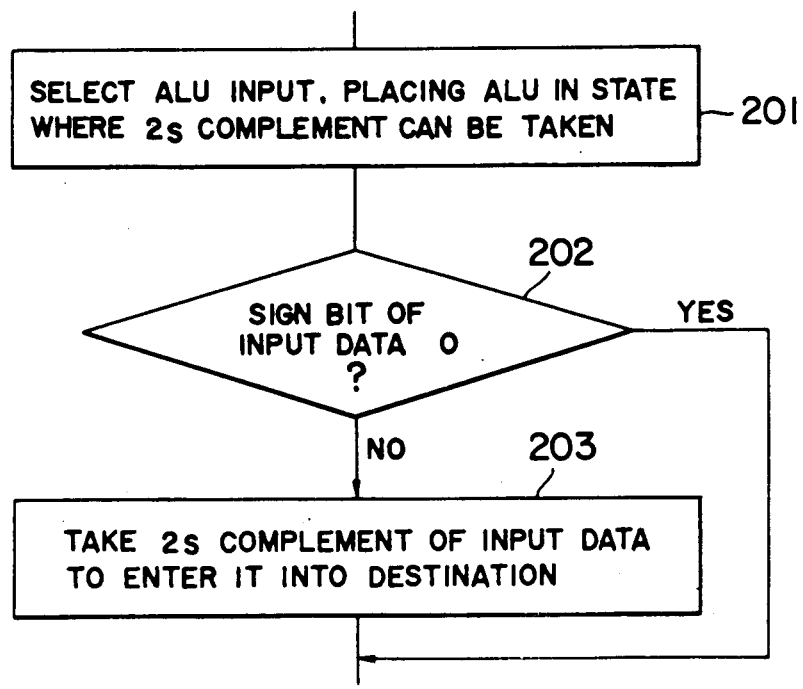
FIG. 9 is a flowchart showing the operation of the processor shown in FIG. 8.

The operation of the microprogram processor shown in FIG. 8 will be described with reference to a flowchart in FIG. 9.

Initially, selection of an ALU input is made by the ALU input selector circuit 5, so as to place the ALU 6 in a state where the 2's complement can be taken (step 201). At this time, a sign bit is taken out from the input data. Then, sign bit of the input data is judged at the jump judgement decoder 2 (step 202). As a result, when the input data is judged to be "1", the 2's complement of the input data is taken in the ALU 6, and sent to the destination address (step 203). In contrast, when the input data is judged to be "0", the program execution jumps to the next step without executing the step 203. As just described above, a processing which required five steps in the prior art can be performed with only three steps in this embodiment. Thus, the processing can speed up by the time corresponding to two steps.

While a sign bit is used for judgement of jump in this embodiment, information of any other suitable portion in the input data may be used as long a the necessity of jump can be judged by such information.

What is claimed is:

1. A microprogram processor comprising:
   memory means for storing microprograms provided with respective macro instructions and generating a microcode;
   microcode decoding means for receiving and decoding said microcode generated from said memory means and generating a first signal signifying the necessity for a microjump and a second signal signifying the immediate start of a next macro instruction when a condition for jumping is not satisfied;
   jump judgment decoding means for receiving a jump condition signal supplied from an external source and said first signal generated determining whether or not a jump should occur and for from said microcode decoding means and for generating a microjump signal which denotes execution of a microjump operation; and
   next instruction start signal generation means for generating a signal for immediately proceeding to the next macro instruction on the basis of said second signal and nonexistence of said microjump signal, said first signal and said signal for immediately proceeding being generated during the same clock period whereby execution of a conditional jump instruction occurs within a single machine cycle.

2. A microprogram processor as set forth in claim 1, wherein said microcode decoding means further generates a third signal signifying proceeding to said next macro instruction.

3. A microprogram processor as set forth in claim 2, wherein said next instruction start signal generation means comprises a logical product circuit connected to receive said second signal from said microcode decoding means and said microjump signal generated from said jump judgement decoding means and for providing output signals and a logical sum circuit connected to receive, respectively, said output signals from said logical product circuit and said third signal generated from said microcode decoding means.

* * * * *